(12) United States Patent
Koefod

(10) Patent No.: US 9,700,884 B2
(45) Date of Patent: Jul. 11, 2017

(54) WATER SOFTENING COMPOSITIONS, AND RELATED SYSTEMS AND METHODS

(71) Applicant: CARGILL, INCORPORATED, Wayzata, MN (US)

(72) Inventor: Robert Scott Koefod, Maple Grove, MN (US)

(73) Assignee: Cargill, Incorporated, Wayzata, MN (US)

( * ) Notice: Subject to any disclaimer, the term of this patent is extended or adjusted under 35 U.S.C. 154(b) by 0 days.

(21) Appl. No.: 14/974,075

(22) Filed: Dec. 18, 2015

(65) Prior Publication Data

US 2016/0207036 A1    Jul. 21, 2016

Related U.S. Application Data

(60) Provisional application No. 62/105,914, filed on Jan. 21, 2015.

(51) Int. Cl.
   *B01J 49/00*   (2017.01)
   *C02F 1/42*    (2006.01)
   *B01J 49/53*   (2017.01)

(52) U.S. Cl.
   CPC .......... *B01J 49/0069* (2013.01); *B01J 49/53* (2017.01); *C02F 1/42* (2013.01); *C02F 2001/425* (2013.01); *C02F 2303/16* (2013.01)

(58) Field of Classification Search
   CPC .......... B01J 49/0069; B01J 49/53; C02F 1/42; C02F 2001/425; C02F 2303/16

USPC .......................................................... 521/26
See application file for complete search history.

(56) References Cited

U.S. PATENT DOCUMENTS

| 3,340,200 A | * | 9/1967 | Noble | ..................... | B01J 49/09 |
| | | | | | 210/511 |
| 3,441,376 A | * | 4/1969 | Anderson | ................ | B01J 47/10 |
| | | | | | 210/674 |

FOREIGN PATENT DOCUMENTS

CN         103768951 A   *   5/2014

* cited by examiner

*Primary Examiner* — Michael M Bernshteyn

(57) ABSTRACT

Water softening compositions, and related systems and methods are disclosed. The present disclosure involves a composition for the regeneration of cation exchange media. The regenerant composition includes an alkali metal formate salt (and optionally a metal halide salt). The present disclosure also involves a systems and methods for treating a cation exchange medium in a water softener to replace hardness cations therefrom with alkali metal cations (such as $Na^+$ and $K^+$. The method includes contacting the media with a regenerant including an alkali metal formate salt (and optionally an alkali metal halide salt). The method also includes contacting the media with the regenerant in an amount sufficient to regenerant the ion exchange medium. According to the method, the hardness cations coupled to the cation exchange media are replaced with the alkali metal cations.

20 Claims, No Drawings

WATER SOFTENING COMPOSITIONS, AND RELATED SYSTEMS AND METHODS

CROSS REFERENCE TO RELATED APPLICATION

The present non-provisional Application claims the benefit of commonly owned provisional Application having Ser. No. 62/105,914, filed on Jan. 21, 2015, which provisional Application is incorporated herein by reference in its entirety.

FIELD

The present disclosure relates generally to water softening composition systems and methods. The present disclosure relates more specifically to compositions or agents for regenerating cation exchange media in water softening systems. Aspects of the disclosure are particularly directed to compositions with reduced chloride for the regeneration of water softener cation exchange media.

BACKGROUND

Cation exchange media, such as zeolites and sulfonated styrene-divinylbenzene co-polymers, are commonly used to remove cationic impurities from solutions. One of their commercial uses is in water softening, where hard water is passed through a bed of cation exchange media to remove the divalent cations causing hardness in water such as calcium ($Ca^{+2}$) and magnesium ($Mg^{+2}$) cations (also referred to as "hardness ions") which can cause problems such as scale formation, mineral stains in laundry, spotting of dishes, and reduced effectiveness of detergents. When hard water is passed through the cation exchange medium, the positively charged hardness ions bind to anionic sites on the cation exchange medium and typically displace monovalent cations (also referred to as "monocations") such as hydrogen ($H^+$), potassium ($K^+$), or sodium ($Na^+$). Thus, hard water is softened by replacing the hardness cations (e.g. calcium ($Ca^{++}$) and magnesium ($Mg^{++}$) in the water with monovalent cations (e.g., hydrogen ($H^+$), potassium ($K^+$), sodium ($Na^+$)). Periodically, all of the cation exchange sites on the cation exchange medium become loaded or saturated with hardness cations, and the cation exchange medium must be regenerated. Regeneration of the cation exchange involves flushing the cation exchange medium with a more concentrated solution of a monovalent salt (e.g., NaCl) or strong acid (e.g., HCl), which displaces the hardness cations from the cation exchange medium and replaces monovalent cations on the cation exchange sites so the cation exchange medium can resume its softening service cycle (e.g., replacing the hardness cations (e.g. calcium ($Ca^{+2}$) and magnesium ($Mg^{+2}$)) in the water with monovalent cations (e.g., hydrogen ($H^+$), potassium ($K^+$), sodium ($Na^+$)).

Potassium chloride (KCl) and sodium chloride (NaCl) are most commonly used as regenerants for residential water softeners using cation exchange media.

The chloride anion ($Cl^-$) plays no direct role in the water softening cation exchange process. The chloride anion ($Cl^-$) is only present as a "spectator anion" because any source of positively charged sodium ($Na^+$) or potassium ($K^+$) cations must include some negatively charged counter anion to permit charge neutrality. An idealized description of a water softening process involves replacing one calcium ion ($Ca^{2+}$) in water with two sodium ions ($Na^+$) donated by a cation-exchange resin.

While it may be commercially impractical to eliminate the need for sodium ($Na^+$) or ($K^+$) potassium cations in standard, residential, cation exchange water softening, in principle it may be possible to seek alternatives to the chloride ($Cl^-$) anion in the water softener salt, i.e. to use some non-chloride sodium or potassium salt as the regenerant. Accordingly, it may be desirable to provide a regenerant for a cation exchange media for a water softener having reduced chloride. Unfortunately, there can be one or more challenges to this. For example, it is desirable that the salt regenerant be non-toxic, highly water soluble, and the anion of the salt regenerant should not interfere substantially with the ion exchange process.

SUMMARY

Disclosed herein are compositions for the regeneration of cation exchange media. The compositions include an alkali metal halide salt and a carboxylate salt selected from the group consisting of an alkali metal formate salt, an alkali metal acetate salt, an alkali metal propionate salt, and combinations thereof.

Also disclosed herein are methods of treating a cation exchange medium in a water softener to replace hardness cations therefrom with alkali metal cations. The methods include:
a) contacting the cation exchange medium with a regenerant comprising an alkali metal carboxylate salt selected from the group consisting of an alkali metal formate salt, an alkali metal acetate salt, an alkali metal propionate salt, and combinations thereof, wherein the cation exchange medium is adapted for water-softening; and
b) contacting the cation exchange medium with the regenerant in an amount sufficient to regenerate the ion exchange medium;
wherein the hardness cations coupled to the cation exchange media are replaced with the alkali metal cations.

Also disclosed in herein are systems for treating a cation exchange medium in a water softener to replace hardness cations therefrom with alkali metal cations. The systems include:
a) a source of a regenerant, wherein the regenerant comprises an alkali metal carboxylate salt selected from the group consisting of an alkali metal formate salt, an alkali metal acetate salt, an alkali metal propionate salt, and combinations thereof and
b) a vessel containing a cation exchange medium, wherein the cation exchange medium is adapted for water-softening, wherein the vessel is in fluid communication with the source of the regenerant, and wherein the vessel is configured to contact the cation exchange medium with the regenerant in an amount sufficient to regenerate the ion exchange medium so that hardness cations coupled to the cation exchange media are replaced with the alkali metal cations.

DETAILED DESCRIPTION

We have found alkali metal formate salts, such as sodium formate (HCOONa) and potassium formate (HCOOK), can function as effective regenerants for cation exchange water softeners and provide an alternative to the chloride ($Cl^-$) anion. Formate is the anion derived from formic acid. Its formula is represented, for example, as ($CHOO^-$), ($HCOO^-$), ($HCO_2^-$). As used in this disclosure, a formate "compound" means a salt of formic acid. Formate compounds such as a formate salt have the formula M(OOCH), where M represents a monovalent cation such as $Na^+$ or $K^+$. One formate salt includes sodium formate (i.e. having the formula HCOONa). Sodium and potassium formate will be alkaline in solution, and this might be expected to be unfavorable for a water softener regenerant since the alkalinity might cause precipitation of calcium hydroxide within the cation exchange medium during regeneration. Also, formate salts will contain a lower percentage of regenerating cation than the chloride salt. Sodium chloride, for example, is 39.34% sodium by weight, while sodium formate contains only 33.80% sodium. However, in spite of these expected disadvantages, we have found that formate salts, such as alkali metal formate, salts such as sodium formate and potassium formate function as an effective regenerant for cation exchange water softeners.

This present disclosure relates to compositions with reduced chloride anions for regenerating cation exchange media. More particularly, the present disclosure relates to compositions (also referred to herein as "regenerant") that include alkali metal halide salts, such as sodium chloride or potassium chloride, in which part or all of the halide (chloride) salt has been replaced with sodium formate (resulting in a reduction of halide (chloride) anions also referred to in this disclosure as "reduced halide" or "reduced chloride") for the regeneration of water softener cation exchange media.

The present disclosure also relates to a composition (regenerant) for the regeneration of cation exchange media. In some aspects of the disclosure, the composition includes formate salts such as alkali metal formate salts such as sodium formate and potassium formate. In some aspects of the disclosure, the composition can include other cation exchange regeneration metal halide salts such as sodium chloride and potassium chloride. The composition can include other additives, such as pellet mushing inhibitors such as sodium hexametaphosphate. Other performance enhancers may be added to the composition, such as ion exchange media cleaning additives such as citric acid, citrate salts, EDTA, phosphoric acid, or other acids, chelating agents, surfactants, or reducing agents. The composition can also include additives to eliminate or control microorganism growth in the ion exchange media.

One aspect of the disclosure is directed toward a water softener salt composition (regenerant) including a mixture of a halide salt, where the halide salt may be selected from alkali metal halide salts (e.g. chloride salts such as sodium chloride, potassium chloride, etc.), and an alkali metal salt. The alkali metal salt may include an anion such as an alkali metal carboxylate salt. Exemplary alkali metal carboxylate salts include an alkali metal formate salt, an alkali metal acetate salt, a alkali metal propionate salt, and combinations thereof. Exemplary alkali metal formate salts may include, for example, sodium formate, potassium formate, etc.

The water softener salt composition may be present in a variety of physical forms. For example, an alkali metal halide salt such as sodium chloride and/or potassium chloride may be in a dry solid particle form (e.g., pellets, cubes, and the like) and an alkali metal salt such as alkali metal formate salt may also be in a dry solid particle form (e.g., pellets, cubes, and the like). In one aspect of the disclosure, the composition can be a plurality of solid particles, wherein each particle includes alkali metal halide salt and alkali metal formate salt. In another aspect of the disclosure, the composition can be a dry mixture of a plurality of first solid particles and a plurality of second solid particles, wherein each particle of the first plurality includes the alkali metal halide salt and each particle of the second plurality includes the alkali metal formate salt. Alternatively, the composition can refer to an aqueous solution form, where the alkali metal halide salt such as sodium chloride and/or potassium chloride and an alkali metal salt such as alkali metal formate salt are dissolved in water.

In one aspect of the disclosure, the alkali metal formate salt (e.g., alkali metal halide salt such as sodium formate) is present in an amount to provide desirable regeneration performance with respect to a cation exchange medium. For example, the alkali metal formate salt can be present in an amount of 100% by weight or less. In one aspect of the disclosure, the alkali metal formate salt is in an amount of at least 0.5% by weight of the total weight of the total composition. In another aspect of the disclosure, the alkali metal formate salt is in an amount of at least 5% by weight of the total weight of the total composition. In another aspect of the disclosure, the alkali metal formate salt is in an amount of at least 10% by weight of the total weight of the total composition. In another aspect of the disclosure, the alkali metal formate salt is in an amount of at least 50% by weight of the total weight of the total composition. In another aspect of the disclosure, the alkali metal formate salt is in an amount of at least 75% by weight of the total weight of the total composition. In another aspect of the disclosure, the alkali metal formate salt is in an amount of at least 90% by weight of the total weight of the total composition. In another aspect of the disclosure, the alkali metal formate salt is in an amount of at least 99.5% by weight of the total weight of the total composition. In another aspect of the disclosure, the amounts of the alkali metal halide salt and the alkali metal formate salts can be selected to provide desirable regeneration performance with respect to a cation exchange medium. In one aspect of the disclosure, the concentration of the alkali metal formate salt (e.g., alkali metal halide salt such as sodium formate) is between 0.5% and 99.5%, and the concentration of the metal halide salt (e.g., alkali metal halide salt such as sodium chloride) is between 0.5% and 99.5%. In another aspect of the disclosure, the concentration of the alkali metal formate salt (e.g., sodium formate) is between 5% and 75%, and the concentration of the metal halide salt (e.g., alkali metal halide salt such as sodium chloride) is between 25% and 95%. In another aspect of the disclosure, the concentration of the alkali metal formate salt (e.g., sodium formate) is between 10% and 50%, and the concentration of the metal halide salt (e.g., alkali metal halide salt such as sodium chloride) is between 50% and 90%. In yet another aspect of the disclosure, the concentration of the alkali metal formate salt (e.g., sodium formate) is between 5% and 50%, and the concentration of the metal halide salt (e.g., alkali metal halide salt such as sodium chloride) is between 50% and 95%. In yet another aspect of the disclosure, the concentration of the alkali metal formate salt (e.g., sodium formate) is between 1% and 50%, and the concentration of the metal halide salt (e.g., alkali metal halide salt such as sodium chloride) is between 50% and 90%. In yet another aspect of the disclosure, the alkali metal formate salt is greater than 50% by weight, and the metal halide salt is less than 50% by weight. In yet another aspect of the disclosure, the alkali metal formate salt is less 50% by weight, and the metal halide salt is greater than 50% by weight.

We have found that blends of sodium formate and sodium chloride are effective in regenerating water softener cation exchange resin, permitting a reduction in the amount of ($Cl^-$) being discharged from the water softener.

EXAMPLES

Aspects of certain methods in accordance with aspects of the disclosure are illustrated in the following examples.

Example 1

Water softener regeneration tests were run according to the following procedure using a small scale water softener simulator. 500 mL of Purolite C100 ion exchange resin was packed in a glass column. Deionized water was used for all test solutions and resin washing. For each run the resin was first backwashed with about 2500 mL of deionized water at a flow rate sufficient to achieve about 50% expansion of the resin bed volume. After backwashing, the resin was loaded with $Ca^{+2}$ by passing 800.0 grams of 10.0% $CaCl_{12}$ solution through the resin at a rate of 27 mL/min. The resin was then slow rinsed with 1200 mL of deionized water at a rate of 27 mL/min and then fast rinsed with 1000 mL of deionized water at a rate of 230-270 mL/min. Then the resin was regenerated with 401.0 g of 10.0% solution of a given test formula, to obtain a brining rate of 5 pounds of regenerant per cubic foot of resin. The flow rate for the brining step was 27 mL/min. After brining, the resin was slow rinsed with 1200 mL of water at a flow rate of 27 ml/min and then fast rinsed with 2000 mL of water at a flow rate of 230-270 ml/min. All of the eluant from the regeneration, the slow, and the fast rinses was collected and weighed to the nearest 0.01 gram. The collected eluant was mixed to homogenize it and then analyzed for $Ca^{+2}$ concentration by titrating with EDTA and using hydroxynaphthol blue as the indicator. From the $Ca^{+2}$ concentration and the total mass of the eluant the total mass of $Ca^{+2}$ removed during the regeneration was calculated. The total mass of $Ca^{+2}$ removed is taken as a measurement of the efficiency of the regeneration. The results of tests on regenerant compositions made up of several different ratios of sodium chloride and sodium formate are given in Table 1.

TABLE 1

| Regenerant Composition | Mass of $Ca^{+2}$ removed (grams) |
|---|---|
| 100% NaCl | 0.63 |
| 100% NaCl | 0.63 |
| 100% NaCl | 0.63 |
| 99.5% NaCl, 0.5% Na Formate | 0.63 |
| 95.0% NaCl, 5.0% Na Formate | 0.63 |
| 90.0% NaCl, 10.0% Na Formate | 0.64 |
| 75.0% NaCl, 25.0% Na Formate | 0.65 |
| 100.0% Na Formate | 0.72 |

Three replicates were run using 100% NaCl to determine the variability of the test method. The method proved to give highly repeatable results. The results in Table 1 show that surprisingly, there is no loss of regeneration efficiency when sodium chloride is replaced by increasing proportions of sodium formate. Indeed, at ratios of 10% sodium formate or higher, the compositions provide even more efficient regeneration than pure NaCl.

Example 2

Another set of water softener regeneration tests were run according to the following procedure using small scale water softener simulators. 500 mL of Purolite C100 ion exchange resin was packed in glass columns. Deionized water was used for all test solutions and resin washing. For each run the resin was first backwashed with about 2500 mL of deionized water at a flow rate sufficient to achieve about 50% expansion of the resin bed volume. Then the resin was regenerated with 401.0 g of 10.0% solution of 50% NaCl, 50% Na Formate salt or 100% NaCl formula, to obtain a brining rate of 5 pounds of regenerant per cubic foot of resin. The flow rate for the brining step was 25-30 mL/min. After brining, the resin was slow rinsed with 1200 mL of water at a flow rate of 25-30 ml/min and then fast rinsed with 1000 mL of water at a flow rate of 230-270 ml/min.

For each softening run, a 5 gallon drum of synthetic hard water was prepared by dissolving enough calcium chloride in deionized water to achieve a calcium hardness of 22 gpg as $CaCO_3$. Calcium hardness was checked by duplicate EDTA titrations prior to the softening run. During the softening run the hard water flow rate was 265-275 mL/minute. The hardness of the softened water was monitored during the softening service cycle with a calcium ion selective electrode in order to determine when the breakthrough point (defined as 1 gpg hardness as per ANSI/NSF 44) was getting close. The mass of the total effluent softened water was measured throughout the softening cycle. When the breakthrough point was near, a series of about 20 bottles of about 200 mL each of softened water was collected and the bottles were analyzed by EDTA titration in order to more precisely determine the endpoint and permit calculation of the softening capacity as grains of hardness per cubic foot of resin. Duplicate regenerations with a 100% NaCl control yielded water softening capacities of 19,824 and 19,867 grains/cubic foot, and regeneration with a composition of 50% NaCl and 50% sodium formate yielded a softening capacity of 19,941 grains/cubic foot. Thus, even when half of the sodium chloride was replaced by sodium formate (relative to 100% sodium chloride as the regenerant) there was no significant loss of regeneration efficiency.

The particular aspects of the disclosure disclosed above are illustrative only, as the present disclosure can be modified and practiced in different but equivalent manners apparent to those skilled in the art having the benefit of the teachings herein. Furthermore, no limitations are intended to the details of construction or design herein shown, other than as described in the claims below. It is therefore evident that the particular aspects of the disclosure disclosed above can be altered or modified and all such variations are considered within the scope and spirit of the present disclosure.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. When the claims use the word "or" in reference to a list of two or more items, that word covers all of the following interpretations of the word: any of the items in the list, all of the items in the list, and any combination of the items in the list.

The above detailed descriptions of aspects of the disclosure of the disclosure are not intended to be exhaustive or to limit the disclosure to the precise form disclosed above. Although specific aspects of the disclosure of, and examples for, the disclosure are described above for illustrative purposes, various equivalent modifications are possible within the scope of the disclosure, as those skilled in the relevant art will recognize. For example, while steps are presented in a given order, alternative aspects of the disclosure may perform steps in a different order. The various aspects of the disclosure described herein can also be combined to provide further aspects of the disclosure.

In general, the terms used in the following claims should not be construed to limit the disclosure to the specific aspects of the disclosure disclosed in the specification, unless the above detailed description explicitly defines such terms. While certain aspects of the disclosure are presented below in certain claim forms, the inventors contemplate the various aspects of the disclosure in any number of claim forms. Accordingly, the inventors reserve the right to add additional claims after filing the application to pursue such additional claim forms for other aspects of the disclosure.

What is claimed is:

1. A composition for the regeneration of cation exchange media comprising:
   a) an alkali metal halide salt; and
   b) an alkali metal carboxylate salt selected from the group consisting of an alkali metal formate salt, an alkali metal acetate salt, an alkali metal propionate salt, and combinations thereof.

2. The composition of claim 1 wherein the metal halide salt comprises a chloride salt.

3. The composition of claim 2 wherein the chloride salt is selected from the group consisting of sodium chloride and potassium chloride.

4. The composition of claim 3 wherein the alkali metal carboxylate salt comprises an alkali metal formate salt selected from the group consisting of sodium formate and potassium formate.

5. The composition of claim 4 comprising 0.5% to 99.5% alkali metal formate salt and 0.5% to 99.5% chloride salt.

6. The composition of claim 5 comprising 5% to 50% alkali metal formate salt and 50% to 95% chloride salt.

7. The composition of claim 4 wherein the alkali metal formate salt is in an amount of at least 0.5% by weight of the total weight of the total composition.

8. The composition of claim 7 wherein the alkali metal formate salt is in an amount of at least 5% by weight of the total weight of the total composition.

9. The composition of claim 8 wherein the alkali metal formate salt is in an amount of at least 99.5% by weight of the total weight of the total composition.

10. The composition of claim 8 wherein the composition is a plurality of solid particles, wherein each particle comprises the alkali metal halide salt and the alkali metal formate salt.

11. The composition of claim 8 wherein the composition is dry mixture of a plurality of first solid particles and a plurality of second solid particles, wherein each particle of the first plurality comprises the alkali metal halide salt and each particle of the second plurality comprises the alkali metal formate salt.

12. A method of treating a cation exchange medium in a water softener to replace hardness cations therefrom with alkali metal cations comprising:
   a) contacting the cation exchange medium with a regenerant comprising an alkali metal carboxylate salt selected from the group consisting of an alkali metal formate salt, an alkali metal acetate salt, an alkali metal propionate salt, and combinations thereof, wherein the cation exchange medium is adapted for water-softening; and
   b) contacting the cation exchange medium with the regenerant in an amount sufficient to regenerate the ion exchange medium;
wherein the hardness cations coupled to the cation exchange media are replaced with the alkali metal cations.

13. The method of claim 12 wherein the regenerant further comprises an alkali metal halide salt and further comprising utilizing the cation exchange medium after step b to soften water having hardness cations.

14. The method of claim 13 wherein the alkali metal carboxylate salt comprises an alkali metal formate salt selected from the group consisting of sodium formate and potassium formate, and the alkali metal halide salt is selected from the group consisting of sodium chloride and potassium chloride.

15. The method of claim 14 wherein the alkali metal formate salt is greater than 50% by weight, and the metal halide salt is less than 50% by weight.

16. The method of claim 14 wherein the alkali metal formate salt is less 50% by weight, and the metal halide salt is greater than 50% by weight.

17. The method of claim 12, wherein the alkali metal formate salt is in an amount of 100% by weight of the total weight of the regenerant.

18. A system for treating a cation exchange medium in a water softener to replace hardness cations therefrom with alkali metal cations, wherein the system comprises:
   a) a source of a regenerant, wherein the regenerant comprises an alkali metal carboxylate salt selected from the group consisting of an alkali metal formate salt, an alkali metal acetate salt, an alkali metal propionate salt, and combinations thereof; and
   b) a vessel containing a cation exchange medium, wherein the cation exchange medium is adapted for water-softening, wherein the vessel is in fluid communication with the source of the regenerant, and wherein the vessel is configured to contact the cation exchange medium with the regenerant in an amount sufficient to regenerate the ion exchange medium so that hardness cations coupled to the cation exchange media are replaced with the alkali metal cations.

19. The system of claim 18 wherein the regenerant further comprises an alkali metal halide salt and the alkali metal carboxylate salt comprises an alkali metal formate salt in an amount of at least 10% by weight of the total weight of the total composition.

20. The system of claim 18, wherein the alkali metal carboxylate salt comprises an alkali metal formate salt in an amount of 100% by weight of the total weight of the regenerant.

* * * * *